United States Patent
Bortolato et al.

(10) Patent No.: US 12,278,450 B2
(45) Date of Patent: Apr. 15, 2025

(54) VEHICLE CHARGING SYSTEM FOR CHARGING AN ELECTRICAL VEHICLE

(71) Applicant: ABB E-mobility B.V., Baden (CH)

(72) Inventors: Matteo Bortolato, Trebaseleghe (IT); Moritz Boehm, Mellingen (CH); Emmanuel Logakis, Baden-Dättwil (CH); Jaroslav Hemrle, Baden-Dättwil (CH); Francisco Garcia-Ferre, Baden (CH); Jean-marc Oppliger, Fislisbach (CH)

(73) Assignee: ABB E-mobility B.V., Delft (NL)

( * ) Notice: Subject to any disclaimer, the term of this patent is extended or adjusted under 35 U.S.C. 154(b) by 604 days.

(21) Appl. No.: 17/582,626

(22) Filed: Jan. 24, 2022

(65) Prior Publication Data
US 2022/0337006 A1 Oct. 20, 2022

Related U.S. Application Data

(63) Continuation of application No. PCT/EP2020/070853, filed on Jul. 23, 2020.

(30) Foreign Application Priority Data

Jul. 25, 2019 (EP) .................................... 19188262

(51) Int. Cl.
*H02J 7/00* (2006.01)
*B60L 53/18* (2019.01)
(Continued)

(52) U.S. Cl.
CPC ............. *H01R 24/28* (2013.01); *B60L 53/18* (2019.02); *H02J 7/0042* (2013.01); *H01R 2103/00* (2013.01); *H01R 2201/26* (2013.01)

(58) Field of Classification Search
USPC ........................................................ 320/109
See application file for complete search history.

(56) References Cited

U.S. PATENT DOCUMENTS

| 4,310,718 A | 1/1982 | Eng |
| 5,670,860 A | 9/1997 | Conrady et al. |

(Continued)

FOREIGN PATENT DOCUMENTS

| CA | 2743899 A1 | 12/2012 |
| CA | 2844486 A1 | 9/2014 |

(Continued)

OTHER PUBLICATIONS

Liu et al., "Appliance and Analysis on Technique of Module Liquid Cooling," *Computer Engineering*, 34: 172-174 (Sep. 2008).

(Continued)

*Primary Examiner* — Samuel Berhanu
(74) *Attorney, Agent, or Firm* — Leydig, Voit & Mayer, Ltd.

(57) ABSTRACT

A system and method relating to a liquid cooled cable arrangement includes a charging connector and a liquid cooled charging cable, wherein the liquid cooled charging cable comprises a plurality of conductors for supplying charging current and at least two fluid channels for supply and return liquid coolant, the charging connector comprises a plurality of bus bars and a plurality of contacts, and the charging connector comprises a second part made from a thermally conductive and electrically insulating material to which the bus bars are attached and to which the fluid channels are thermally connected such that heat generated in the contacts during charging can be removed by the liquid coolant, and/or the bus bars may include bus bar fluid channels to which the fluid channels are thermally connected (Continued)

such that heat generated in the contacts during charging can be removed by the liquid coolant.

15 Claims, 5 Drawing Sheets

(51) Int. Cl.
  *H01R 24/28* (2011.01)
  *H01R 103/00* (2006.01)

(56) References Cited

U.S. PATENT DOCUMENTS

| | | | |
|---|---|---|---|
| 5,684,380 | A | 11/1997 | Woody et al. |
| 6,063,998 | A | 5/2000 | Rolf et al. |
| 6,396,241 | B1 | 5/2002 | Ramos et al. |
| 9,287,646 | B2 | 3/2016 | Mark |
| 10,029,575 | B2 | 7/2018 | Remisch |
| 10,081,262 | B2 | 9/2018 | Nagel et al. |
| 2005/0006116 | A1 | 1/2005 | Rehrig |
| 2005/0051113 | A1 | 3/2005 | Wakao et al. |
| 2005/0205335 | A1 | 9/2005 | Reed et al. |
| 2009/0167078 | A1 | 7/2009 | Watanabe |
| 2009/0188263 | A1 | 7/2009 | Murray et al. |
| 2010/0252006 | A1 | 10/2010 | Reddy |
| 2011/0015856 | A1 | 1/2011 | Arnold |
| 2011/0062137 | A1 | 3/2011 | Wu |
| 2012/0006288 | A1 | 1/2012 | Winstead |
| 2013/0014520 | A1 | 1/2013 | Murray et al. |
| 2013/0029193 | A1 | 1/2013 | Dyer et al. |
| 2014/0062397 | A1 | 3/2014 | Dyer et al. |
| 2015/0217654 | A1 | 8/2015 | Woo et al. |
| 2016/0200206 | A1* | 7/2016 | Woo .............. B60L 53/11 320/109 |
| 2016/0221458 | A1 | 8/2016 | Lopez et al. |
| 2016/0251012 | A1 | 9/2016 | Schneider et al. |
| 2017/0028862 | A1 | 2/2017 | Nagel et al. |
| 2017/0144558 | A1 | 5/2017 | Remisch |
| 2017/0338023 | A1 | 11/2017 | Ansari et al. |
| 2018/0095058 | A1 | 4/2018 | McQuillen et al. |
| 2018/0095059 | A1 | 4/2018 | McQuillen et al. |
| 2018/0158572 | A1 | 6/2018 | Ernst et al. |
| 2018/0190410 | A1 | 7/2018 | Cao et al. |
| 2018/0264957 | A1 | 9/2018 | Fuehrer et al. |
| 2018/0277283 | A1 | 9/2018 | Remisch et al. |
| 2019/0176653 | A1 | 6/2019 | Fuehrer et al. |
| 2019/0315239 | A1 | 10/2019 | Beimdieck et al. |
| 2020/0243221 | A1* | 7/2020 | Gontarz .............. B60L 53/16 |

FOREIGN PATENT DOCUMENTS

| | | |
|---|---|---|
| CN | 1172063 A | 2/1998 |
| CN | 201242574 Y | 5/2009 |
| CN | 201696143 U | 1/2011 |
| CN | 103219775 A | 7/2013 |
| CN | 203278307 U | 11/2013 |
| CN | 203800260 U | 8/2014 |
| CN | 104467570 A | 3/2015 |
| CN | 204206044 U | 3/2015 |
| CN | 204651964 U | 9/2015 |
| CN | 105355276 A | 2/2016 |
| CN | 205158923 U | 4/2016 |
| CN | 205229431 U | 5/2016 |
| CN | 205365160 U | 7/2016 |
| CN | 105835709 A | 8/2016 |
| CN | 105896678 A | 8/2016 |
| CN | 205544446 U | 8/2016 |
| CN | 205544481 U | 8/2016 |
| CN | 205544495 U | 8/2016 |
| CN | 105977722 A | 9/2016 |
| CN | 106104949 A | 11/2016 |
| CN | 205737000 U | 11/2016 |
| CN | 106240396 A | 12/2016 |
| CN | 106347166 A | 1/2017 |
| CN | 205946487 U | 2/2017 |
| CN | 206118290 U | 4/2017 |
| CN | 106782835 A | 5/2017 |
| CN | 206211595 U | 5/2017 |
| CN | 106882057 A | 6/2017 |
| CN | 106887277 A | 6/2017 |
| CN | 106887872 A | 6/2017 |
| CN | 107082030 A | 8/2017 |
| CN | 107147154 A | 9/2017 |
| CN | 107148193 A | 9/2017 |
| CN | 107234976 A | 10/2017 |
| CN | 107244257 A | 10/2017 |
| CN | 107317370 A | 11/2017 |
| CN | 107323286 A | 11/2017 |
| CN | 206615088 U | 11/2017 |
| CN | 206633834 U | 11/2017 |
| CN | 107454877 A | 12/2017 |
| CN | 107499162 A | 12/2017 |
| CN | 107508333 A | 12/2017 |
| CN | 206703980 U | 12/2017 |
| CN | 206807044 U | 12/2017 |
| CN | 206870875 U | 1/2018 |
| CN | 206931178 U | 1/2018 |
| CN | 207106222 U | 3/2018 |
| CN | 108076617 A | 5/2018 |
| CN | 108082000 A | 5/2018 |
| CN | 207291701 U | 5/2018 |
| CN | 207360110 U | 5/2018 |
| CN | 207388959 U | 5/2018 |
| CN | 207416560 U | 5/2018 |
| CN | 207416580 U | 5/2018 |
| CN | 108123260 A | 6/2018 |
| CN | 207523476 U | 6/2018 |
| CN | 207535718 U | 6/2018 |
| CN | 108297716 A | 7/2018 |
| CN | 108362491 A | 8/2018 |
| CN | 108365380 A | 8/2018 |
| CN | 108711657 A | 10/2018 |
| CN | 109075478 A | 12/2018 |
| CN | 109075498 A | 12/2018 |
| CN | 109076717 A | 12/2018 |
| CN | 109689424 A | 4/2019 |
| CN | 110040005 A | 7/2019 |
| DE | 3420822 C1 | 10/1985 |
| DE | 102009011088 A1 | 9/2010 |
| DE | 102010007975 A1 | 8/2011 |
| DE | 102010050562 B3 | 4/2012 |
| DE | 102011100389 A1 | 5/2012 |
| DE | 102015005118 A1 | 10/2016 |
| DE | 102015114133 A1 | 3/2017 |
| DE | 102015117508 A1 | 4/2017 |
| DE | 102015119338 A1 | 5/2017 |
| DE | 102016105308 A1 | 9/2017 |
| DE | 102016105311 A1 | 9/2017 |
| DE | 102016105347 A1 | 9/2017 |
| DE | 102016107409 A1 | 10/2017 |
| DE | 102016206266 A1 | 10/2017 |
| DE | 102016206300 A1 | 10/2017 |
| DE | 102016117261 B3 | 11/2017 |
| DE | 102017200465 A1 | 11/2017 |
| DE | 102016112306 A1 | 1/2018 |
| DE | 102016117011 A1 | 3/2018 |
| DE | 102016117439 A1 | 3/2018 |
| DE | 102016118191 A1 | 3/2018 |
| DE | 102016121629 A1 | 5/2018 |
| DE | 102016221857 A1 | 5/2018 |
| DE | 202017101551 U1 | 6/2018 |
| DE | 102017217506 A1 | 4/2019 |
| EP | 0823766 A1 | 2/1998 |
| EP | 0982832 A2 | 3/2000 |
| EP | 3257701 A2 | 12/2017 |
| EP | 3330118 A1 | 6/2018 |
| FR | 3050192 A1 | 10/2017 |
| JP | 2000-133058 A | 5/2000 |
| JP | 2001-270481 A | 10/2001 |
| JP | 2003-209020 A | 7/2003 |
| JP | 3678465 B2 | 8/2005 |
| JP | 2008-044437 A | 2/2008 |
| JP | 2008-044439 A | 2/2008 |
| JP | 2008-048493 A | 2/2008 |

(56) References Cited

FOREIGN PATENT DOCUMENTS

| | | |
|---|---|---|
| JP | 2009-232656 A | 10/2009 |
| JP | 2010-63265 A | 3/2010 |
| JP | 2010-74937 A | 4/2010 |
| JP | 2010-267917 A | 11/2010 |
| JP | 2010-268664 A | 11/2010 |
| JP | 2011-8441 A | 1/2011 |
| JP | 2011-125184 A | 6/2011 |
| JP | 2011-130609 A | 6/2011 |
| JP | 2011-217557 A | 10/2011 |
| JP | 2012-238532 A | 12/2012 |
| JP | 2013-103587 A | 5/2013 |
| JP | 2013-106423 A | 5/2013 |
| JP | 2013-201842 A | 10/2013 |
| JP | 2015-68174 A | 4/2015 |
| JP | 2015-86446 A | 5/2015 |
| JP | 2015-109209 A | 6/2015 |
| JP | 2015-230618 A | 12/2015 |
| JP | 2018-101749 A | 6/2018 |
| KR | 10-2010-0110945 A | 10/2010 |
| KR | 10-2018-0057411 A | 5/2018 |
| MX | 2009000965 A | 7/2010 |
| RU | 165524 U1 | 10/2016 |
| WO | WO 2013/064738 A1 | 5/2013 |
| WO | WO 2013/140502 A1 | 9/2013 |
| WO | WO 2014/024341 A1 | 2/2014 |
| WO | WO 2015/099776 A1 | 7/2015 |
| WO | WO 2016/005438 A1 | 1/2016 |
| WO | WO 2017/133893 A1 | 8/2017 |
| WO | WO 2017/143295 A1 | 8/2017 |
| WO | WO 2017/162464 A1 | 9/2017 |
| WO | WO 2017/162494 A1 | 9/2017 |
| WO | WO 2017/162532 A1 | 9/2017 |
| WO | WO 2017/162651 A1 | 9/2017 |
| WO | WO 2017/201017 A2 | 11/2017 |
| WO | WO 2017/222910 A1 | 12/2017 |
| WO | WO 2018/006903 A1 | 1/2018 |
| WO | WO 2018/050724 A1 | 3/2018 |
| WO | WO 2018/060151 A1 | 4/2018 |
| WO | WO 2018/094927 A1 | 5/2018 |
| WO | WO 2018/155895 A1 | 8/2018 |

OTHER PUBLICATIONS

European Patent Office, International Search Report in International Patent Application No. PCT/EP2020/070853, 3 pp. (Aug. 26, 2020).
European Patent Office, Written Opinion in International Patent Application No. PCT/EP2020/070853, 5 pp. (Aug. 26, 2020).

* cited by examiner

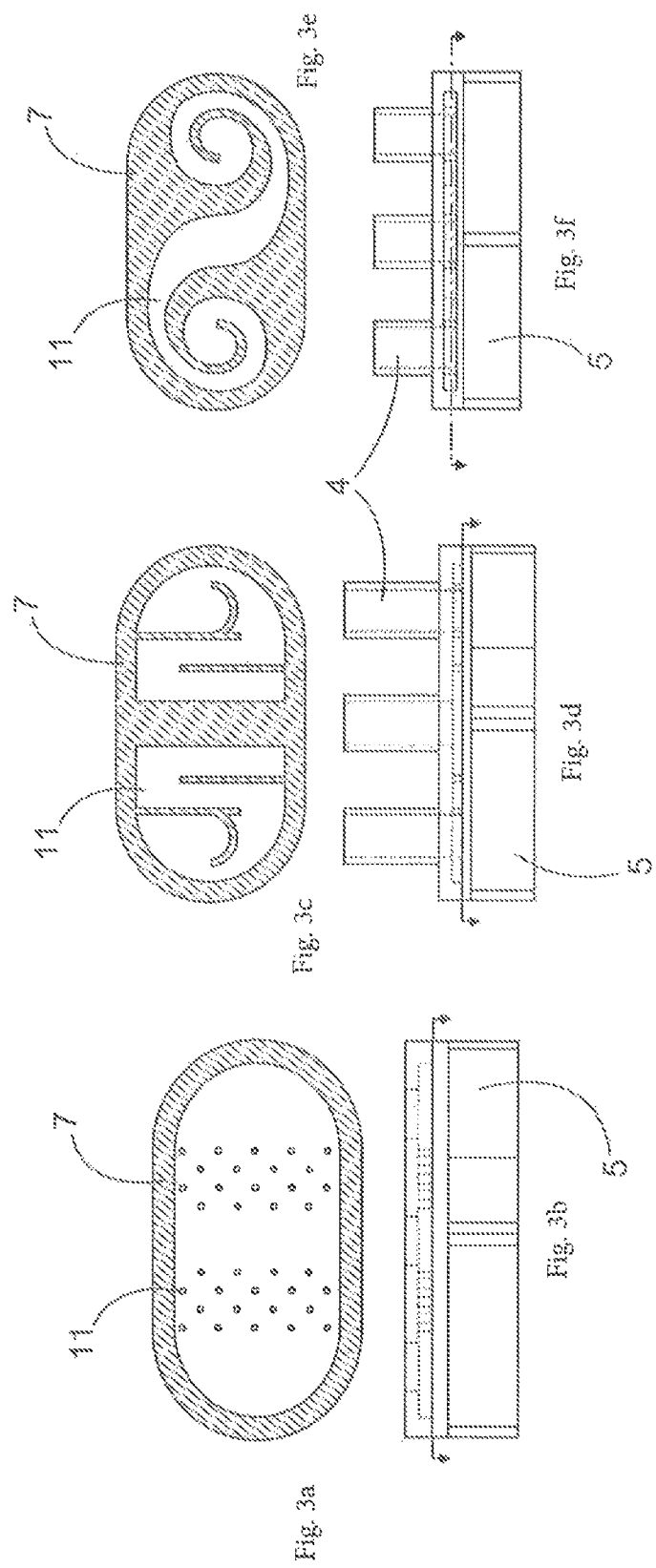

VEHICLE CHARGING SYSTEM FOR CHARGING AN ELECTRICAL VEHICLE

CROSS-REFERENCE TO RELATED APPLICATIONS

This patent application claims priority to European patent application no. 19188262.0, filed on Jul. 25, 2019, and to International patent application no. PCT/EP2020/070853, filed on Jul. 23, 2020, which are incorporated herein in their entirety by reference.

FIELD OF THE DISCLOSURE

The disclosure relates to a liquid cooled cable arrangement for high-power fast charging of electric vehicles, and related method, comprising a charging connector and a liquid cooled charging cable, whereby the liquid cooled charging cable comprises a plurality of conductors for supplying charging current and at least two fluid channels for supply and return liquid coolant.

BACKGROUND OF THE INVENTION

A liquid cooled charging cable for high power charging of electric vehicles, EVs, typically includes a cable arrangement, including a plurality of conductors and a charging connector, wherein power contacts are located. The coolant loop in the charging cable is generally designed to remove heat generated by Joule effect both in the charging cable and in the charging connector. The liquid cooled charging cable is connected to a cooling unit, generally located inside a charge post, where the heat provided to the coolant by Joule effect is preferably dissipated to the surrounding ambient air.

Such liquid cooling is necessary for high-current fast EV chargers, mainly because the liquid cooling avoids other necessary use of bulky charging conductors which would make the charging cable very difficult to handle. Furthermore, the liquid cooling in the charging cable must be designed to meet the clause reported in standard IEC 62196-1, which limits temperature rise of electrical terminals in the charging connector to 50 degrees K maximum. Therefore, the coolant is generally supplied through the charging cable directly to a power contact area comprising power contacts within the charging connector and then used to cool the conductors in return channels.

In a liquid cooled charging cable, within a common charging cable length range from 4 m to 6 m, the contact resistance between the power contacts of the charging cable's connector and mating contacts in a car socket is typically a few percent of the ohmic resistance of the conductors. Hence, when charging an EV at 500 A, heat generated in each power contact of the charging connector is negligible as compared to the total heat generated through the conductors' length.

In prior art, for cost-effectiveness reasons, the geometry of the power contacts does not change in low power charging cables such as up to 200 A and in high power charging cables such as up to 500 A as of today. As a consequence, when charging an EV at 500 A, even in a cooled charging cable, a very high temperature gradient between 20° C. and 30° C. is expected along the power contacts in the charging connector.

In existing solutions, the power contacts are electrically connected to the conductors through a very small area, for example crimped, and the coolant path sur-rounds or is embedded within that small area. This means that, in existing configurations, when charging at high currents, a very large heat flux, i.e. heat load divided by area, must be removed from the power contacts. As a consequence, a derating of the charging current shall be performed when ambient air temperature is above 35-40° C. to comply with the limitations of the IEC 62196-1.

A possible solution to decrease the temperature gradient and thus the maximum temperature of the power contact elements consists in embedding thermal management devices, such as heat pipes, along fingers of the power contacts, which have generally a tulip shape. Considering the number of mating cycles expected during the lifetime of a charging cable, such solution would entail special design and reliability requirements for the heat pipes. Furthermore, the design for replaceable power contacts would be very complicated and likely expensive.

Another solution is represented by manufacturing of channels along the tulip fingers. This solution is very efficient from the thermal management point of view, but it likely implies high pressure drop when working at low temperature, such as below −25° C., and it is not cost-effective in the current ratings up to 500 A.

To comply with the limitation imposed by IEC 62196-1, either a big air-to-coolant heat exchanger and a big pump providing a high coolant mass flow rate shall be adopted in the typical cooling unit. In this way, the coolant supply temperature is as close as possible to the ambient air temperature. In many of the existing geometries, a high flow rate would imply an excessive pressure drop through the liquid cooled cable. Another option is the use of a cooling unit including a refrigerant loop, with much more components, such as a compressor, lamination valve, evaporator, to have an inlet temperature of the coolant almost independent on the ambient air temperature. However, said solutions reduce the cost effectiveness and the reliability of the whole liquid cooling, and are thus not preferred.

BRIEF SUMMARY OF THE INVENTION

It is therefore an aspect of the disclosure to provide a charging connector for charging an electrical vehicle that overcomes the drawbacks explained before.

The aspect of the disclosure solves the drawbacks of current solutions by the features of the independent claims. Preferred embodiments are detailed in the dependent claims.

Thus, the object is solved by a liquid cooled cable arrangement for high-power fast charging of electric vehicles, comprising
- a charging connector and a liquid cooled charging cable, whereby
- the liquid cooled charging cable comprises a plurality of conductors for supplying charging current and at least two fluid channels for supply and return liquid coolant,
- the charging connector comprises a plurality of bus bars and a plurality of contacts,
- each one conductor is electrically and thermally connected to one bus bar and via the bus bar to one contact, and
- the charging connector comprises a second part consisting of a thermally conductive and electrically insulating material to which the bus bars are attached and to which the fluid channels are thermally connected such that heat generated in the contacts during charging can be removed by the liquid coolant, and/or
- the bus bars comprise bus bar fluid channels to which the fluid channels are thermally connected such that heat generated in the contacts during charging can be removed by the liquid coolant.

One important aspect of the proposed solution is that a maximum operating temperature of the power contact elements is reduced as compared to existing solutions known from prior art. Therefore, a heat transfer area between the contacts and the coolant fluid is increased in the charging connector by said bus bars, thereby acting as heat sinks. The contacts, also referred to as power contacts, are for this purpose not directly connected to the conductors but rather through bus bars, provided for example as metal blocks. The bus bars are preferably made by copper or aluminium. Thus, use of bus bars enhances the heat transfer area between the contacts and the coolant, thereby allowing higher current rates such as 600 A that could be considered in future standards for liquid cooled charging cables. The solution advantageously reduces contact resistance and thermal losses, while durability of the contacts over time is increased. Lower temperature also leads to the use of a more reliable, compact and cost-effective cooling unit in a charge post, such as an EVSE, while complying with present limitation imposed by IEC 62196 standard on the maximum temperature rise of electrical terminals in a charging cable's charging connector. Thus, a peculiarity of the solution lies in particular in the reduction of the temperature at a base of the power contacts, that is to say at a point where the power contacts are connected to the rest of the charging connector.

The proposed solution for reducing the maximum temperature on the contacts is beneficial for at least three main reasons. First, since electrical resistance of the contacts increase with temperature, a lower temperature of the contacts implies lower thermal losses due to Joule effect. Second, a lower maximum working temperature increases the reliability and durability of the contacts, which must survive a high number of mating cycles. The higher the maximum working temperature, the softer the copper of the contacts becomes over time. If the material of the contacts becomes softer, their elastic behaviour is affected, and the contact provided with pins of an electric vehicle socket during charging becomes weaker. This in turns increases the electrical resistance and the thermal losses. Third, no performance derating is needed at high ambient air temperature. The solution can be used with either dielectric fluids or for a safe use of electrically conductive fluids which generally have better thermal properties as compared to dielectric fluids.

The liquid cooled cable arrangement can be used as part of an electric vehicle supply equipment, EVSE, also referred to as electric vehicle, EV, charging station, electric recharging point, charging point, charge point, charge post or electronic charging station, ECS. The EVSE is an element in an infrastructure that supplies electric energy for recharging of electric vehicles, including electric cars, neighbourhood electric vehicles and plug-in hybrids. EVSEs usually comply with standards for electric vehicle fast charging, such as the so-called Combined Charging System, CCS, protocol according to IEC 61851-23 and SAE J1772 standard for charging electric vehicles both in the US and in the European Union, EU. The Combined Charging System, CCS, protocol is a fast charging method for charging electric vehicles delivering high-voltage direct current via a charging connector derived from SAE J1772 standard (IEC Type 1) or IEC Type 2 connector. Automobile manufactures that support CCS include Jaguar, Volkswagen, General Motors, BMW, Daimler, Ford, FCA, Tesla and Hyundai. The CSS standard is controlled by the so called CharIN consortium. Besides other protocols such as, for example, CHAdeMO, as abbreviation of CHArge de Move, or GB/T, in particular according to 20234.3-2011 standard. The proposed solution can be advantageously used with even higher charging currents such as more than 500 A and/or in combination with newer standards not yet defined requiring higher currents. Numerical analysis on thermal performance of the proposed arrangement showed that a maximum temperature rise of the contacts, which are also referred to as power contact elements, during a charge session at 500 A to 600 A is below 42 K in an ambient temperature range from −40° C. to +55° C. With low viscosity synthetic fluids as cooling liquids, in the foreseen flow rate range, the maximum pressure drop in the charging connector is around 2 or even below 1.2 bar.

According to a preferred implementation, the charging connector comprises a first part connected to the liquid cooled charging cable and crossed by the conductors and the fluid channels. The first part is preferably made of plastic and can be connected to an inner pipe of the charging cable preferably by gluing so that the coolant liquid can flow in respectively through the first part. The conductors preferably come out from the first part through holes that can be threaded to connect cable glands. Alternatively, the conductors can be provided with special sealing ends, for example by means of potting and/or adding insulating layer, to assure tightness of the coolant loop. The first part preferably exhibits channels for the fluid supply and return.

In a further preferred implementation, the bus bars extend perpendicularly to the conductors and the contacts and/or whereby the conductors and the contacts are arranged perpendicularly displaced from each other by the bus bars. The conductors and the power contacts are electrically and thermally attached ordinately to the bus bars, which such way advantageously act as heat sinks. Such way bus bars in terms of the present application shall not be understood as simple plates to which the contacts are connected but rather as said heat sinks which can thus be cooled by the liquid cooling flowing in the fluid channels thereby removing heat from the contacts.

According to a preferred implementation the liquid cooled cable arrangement comprises the second part, whereby the second part comprises second fluid channels arranged within the second part and connected to the fluid channels of the first part for conveying the liquid coolant. The channels of the second part are preferably connected to the channels of the first part preferably by gluing, through push-in fittings and/or compression fittings. The second fluid channels can be provided as a hollow chamber provided therein and connecting at least two of the fluid channels for supply and return liquid coolant flow, thereby advantageously removing heat generated in the contacts while charging the electrical vehicle. The inner geometry of the hollow chamber respectively of the second fluid channels in the second part preferably enhances fluid turbulence and provide uniform flow distribution.

In a further preferred implementation, the liquid cooled cable arrangement comprises the second part thereby preferably acting as bus bars holder and the liquid coolant flowing in the fluid channels, whereby the coolant is an electrically conductive fluid. The electrically conductive fluid can be provided, for example, as water/glycol or water/salts mixture, or as other means known from prior art. The second part is preferably made of ceramics such as for example alumina, aluminum nitride, silicon nitride etc. Alternatively, the second part can be made of plastic filled with thermally conductive but electrical insulating particles, such as for example alumina ($Al_2O_3$), silica ($SiO_2$), beryllium oxide (BeO), and/or graphene oxide (GO), nitrides like aluminium nitride (AlN), boron nitride, preferably including hexagonal boron nitride, cubic boron nitride, and/or boron nitride nanotubes, silicon nitride (Si3N4), barium titanate (BaTiO3) and diamond. The filler content can be in the range of 0.1 to 50 wt. %, and preferably in the range of 5 to 30 wt. %. The latter implementation improves potentially issues of ceramic based materials related to brittleness.

In a further preferred implementation the bus bars are brazed, glued and/or mechanically connected to the second part. In particular in the last case a thermal interface material can be positioned in between the bus bars and the second part. The conductors and the power contacts are electrically and thermally attached to the bus bars. The second part can be advantageously formed to hold the bus bars in a defined position and/or distant from each other. The position is preferably defined such that the bus bars extend with their longitudinal extension orthogonal to the longitudinal extension of the contacts and/or of the conductors, at least in an area where the conductors are attached to the bus bars. Further, the second part can be designed to encapsulate at least partially a cross section of the bus bars.

According to a preferred implementation the liquid cooled cable arrangement comprises the bus bar fluid channels and the liquid coolant flowing in the fluid channels, whereby the coolant is a dielectric fluid. The dielectric fluid can be provided as a synthetic fluid or a hydraulic oil. In such an implementation bus bar fluid channels are fluidly connected to the fluid channels of the first part. An inner geometry of the bus bar fluid channels preferably enhances fluid turbulence and provide uniform flow distribution.

In another preferred implementation the conductors are crimped and/or welded to the bus bars and/or whereby contacts are connected to the bus bars by a push-in mechanism, by screwing and/or by welding. Such implementations allow simply but reliable electrical connections between the conductors and bus bars respectively between the bus bars and the contacts.

According to a preferred implementation the charging connector comprises a connector housing, wherein at least the bus bars are encapsulated within a soft epoxy and/or silicone-based material, whereby the conductors and the contacts are connected through the housing and/or through the encapsulation to the bus bars. Preferably, the first part and/or the second part are encapsulated as well with the soft epoxy and/or the silicone-based material. In a preferred implementation, the geometry of the housing and of components of the charging connector provided therein is designed to allow the encapsulation by potting. By such implementation humidity, dirt and/or water cannot cause short circuit if the connector housing gets broken or loses its IP protection. Further, all components of the charging connector provided therein are not exposed to the user of the charging connector and thus cannot damage heath of the user.

In another preferred implementation the contacts comprise cooling channels connected to the fluid channels. The cooling channels are preferably fluidly and thermally connected to the fluid channels thereby allowing to absorb heat from the contacts by conveying cooling fluid. According to a further preferred implementation the contacts comprise pockets for thermocouples, pockets for contact springs close to tips of the contacts and/or stress relief openings at joints between different contacts. Such implementations advantageously allow higher heat flux removal at the contacts.

In another embodiment, in order to supply current higher than 600 A, the bus bars can be provided with vapour chambers, for advantageously enabling heat spreading from the contact elements onto the bus bar surface and to enhance the heat transfer with the coolant.

The object is further solved by a method for liquid cooling a charging connector connected to a liquid cooled charging cable for high-power fast charging of electric vehicles, whereby the liquid cooled charging cable comprises a plurality of conductors for supplying charging current and at least two fluid channels for supply and return liquid coolant, the charging connector comprises a plurality of bus bars and a plurality of contacts, each one conductor is electrically and thermally connected to one bus bar and via the bus bar to one contact, and the second part consists of a thermally conductive and electrically insulating material to which the bus bars are connected distant from each other and to which the channels are thermally connected, and/or the bus bars comprise bus bar fluid channels to which the fluid channels are thermally connected, comprising the step of conveying liquid coolant through the fluid channels for removing heat generated during charging in the contacts.

The proposed method allows for advantageously reducing a maximum temperature on the contacts such that higher charging current can be supplied for charging the electric vehicle.

In a preferred implementation of the method, comprising the second part, whereby the second part comprises second fluid channels connected to the fluid channels, the method comprises the step of: Conveying liquid coolant through the second fluid channels for removing the heat generated during charging in the contacts.

In a further preferred implementation of the method, whereby the bus bars comprise bus bar fluid channels connected to the fluid channels, the method comprises the step of: Conveying liquid coolant through the bus bar fluid channels for removing the heat generated during charging in the contacts.

Further embodiments and advantages of the method are directly and unambiguously derived by the person skilled in the art from the system as described before.

BRIEF DESCRIPTION OF THE SEVERAL VIEWS OF THE DRAWING(S)

These and other aspects of the disclosure will be apparent from and elucidated with reference to the embodiments described hereinafter.

FIGS. 3a-3f show three different configurations in plan and section view for a front end of the first part of FIG. 1 for the second part from left to right, as cross section in the upper row and sectional view in the lower row according to three different preferred implementations.

Figure 4A:
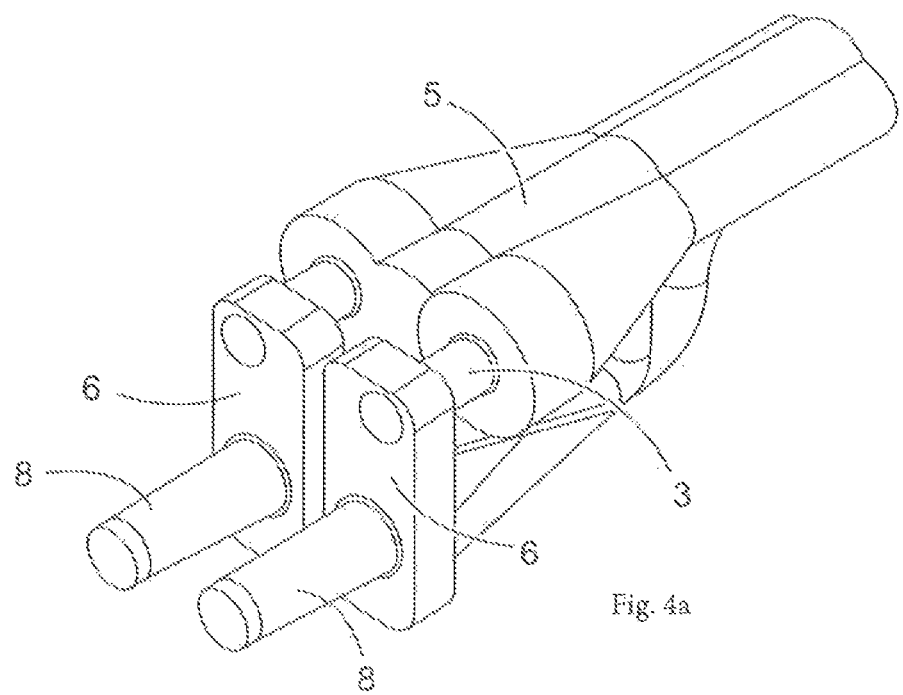
FIGS. 4a and 4b show a liquid cooled cable arrangement comprising a first part and a second part provided as bus bars according to another preferred implementation in two schematic views.
Figure 4B:
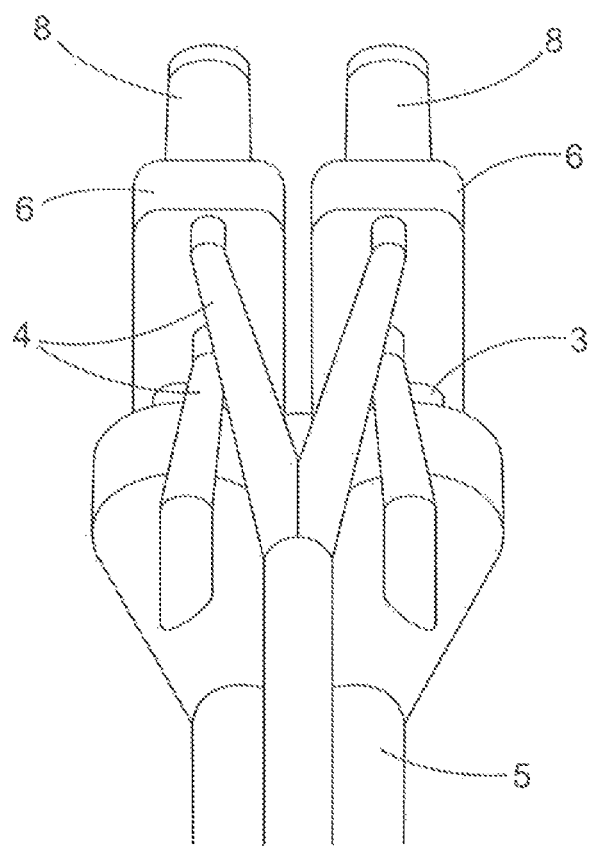
Figures 5A, 5B, 5C:
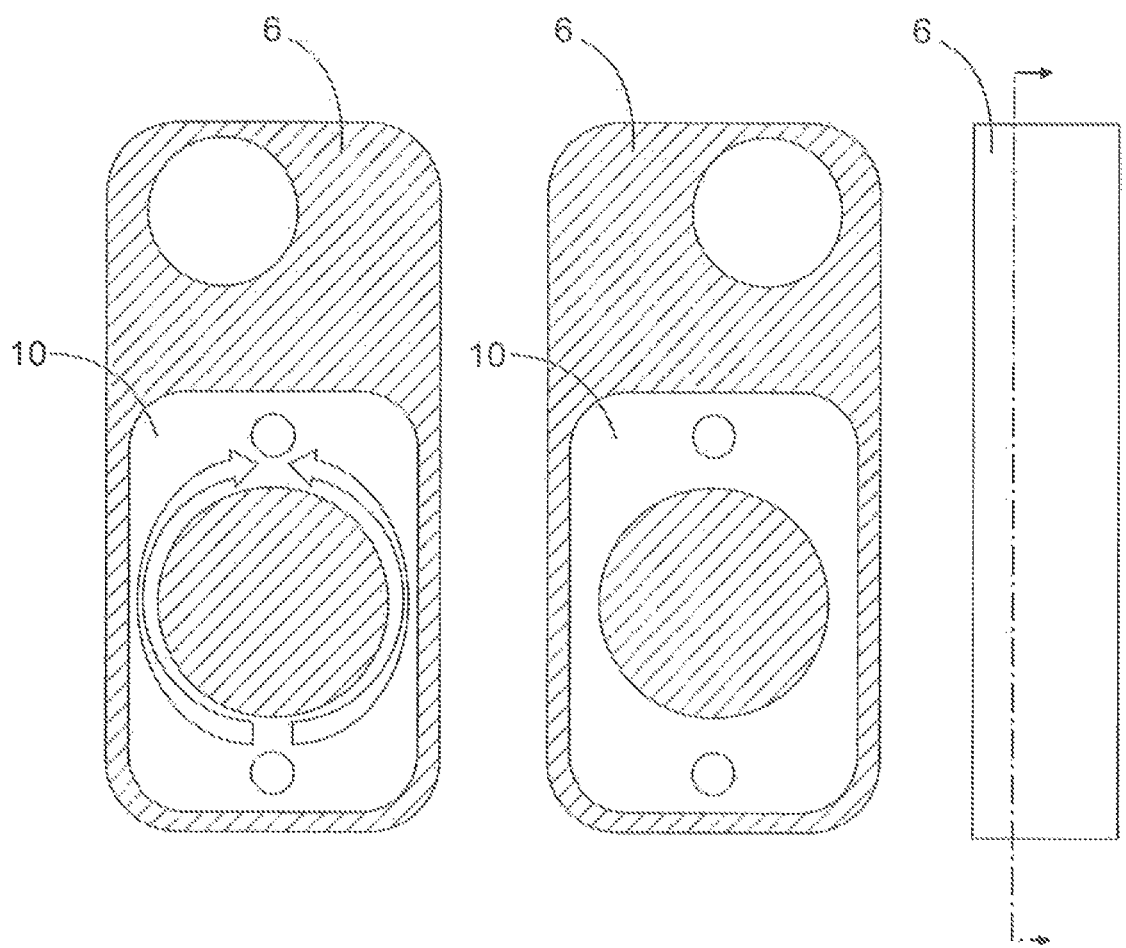

FIGS. 5a, 5b, and 5c show different configurations of inner geometries of the bus bars of FIG. 4 in different schematic views.

DETAILED DESCRIPTION OF THE INVENTION

Figure 1:
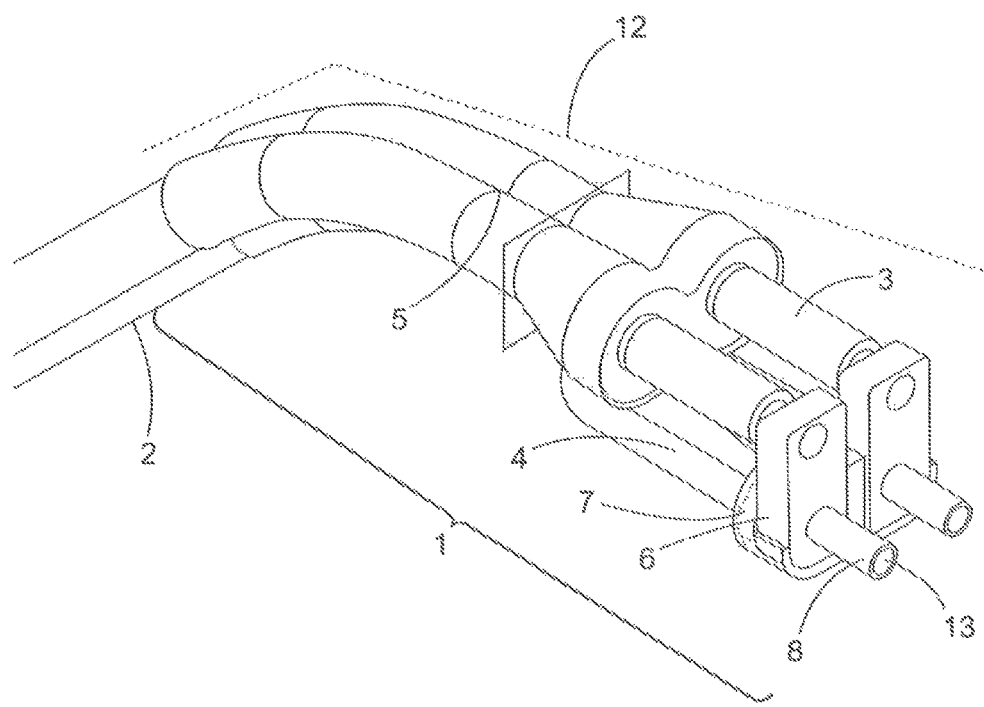
FIG. 1 shows a liquid cooled cable arrangement comprising a first part and a second part according to a preferred implementation in a schematic view in accordance with the disclosure.
Figure 2:
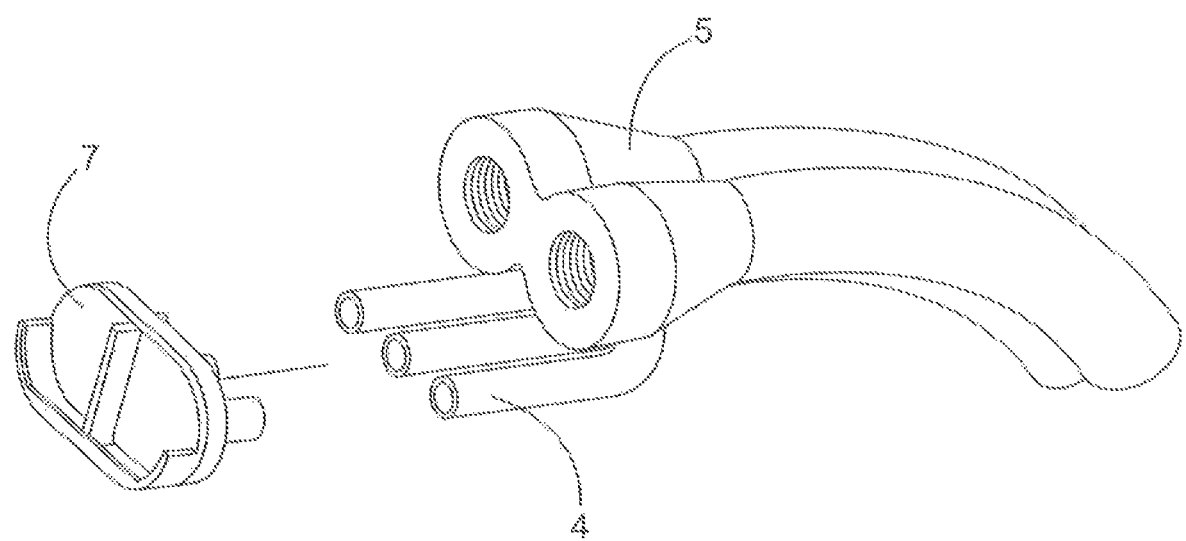
FIG. 2 shows the first part and the second part of FIG. 1 in an enlarged and spread view.

FIG. 1 shows a liquid cooled cable arrangement according to a preferred implementation in a schematic view for high-power fast charging of electric vehicles. The arrangement comprises a charging connector 1 and a liquid cooled charging cable 2. The liquid cooled charging cable 2 comprises a plurality of conductors 3 for supplying charging current and at least two fluid channels 4 for supply and return liquid coolant.

The charging connector 1 comprises a first part 5, a plurality of bus bars 6, a second part 7, as shown in FIG. 1, and a plurality of contacts 8 for connecting to respective socket of an electric vehicle, not shown. The fluid channels 4 proceed through the first part 5.

The first part 5 is made of plastic and is connected to an inner pipe of the charging cable 2 so that the coolant can flow inside the first part 5, for example by gluing the inner pipe to the fluid channels 4. The conductors 3 are coming out from the first part 5 through holes that can be threaded to connect cable glands. Alternatively, the conductors 3 can be provided with sealing ends, for example by means of potting, to assure tightness of the coolant loop provided by the fluid channels 4. The first part 5 thus exhibits the fluid channels 4 for the fluid supply and return. The fluid channels 4 are connected for example by means of gluing with the second part 7 of the charging connector 1.

Each one conductor 3 is electrically and thermally connected to one bus bar 6 and via the bus bar 6 to one contact 8. The implementation in FIG. 1 comprises each two conductors 3, two bus bars 6 and two contacts 8, one conducting a positive current, DC+, and one for conducting a negative current, DC−. The bus bars 6 extend with their longitudinal extension perpendicularly to the longitudinal extension of the conductors 3 and to the contacts 8 i.e. in connection direction of the charging connector 1, such that the conductors 3 and the contacts 8 are perpendicularly displaced from each other by the bus bars 6.

The bus bars 6 are designed that the conductors 3 can be crimped or welded on the top part of the bus bars 6. On the front of the bus bars 6, the power contacts 8 are connected so that they mate with a corresponding car socket and can also be replaceable. The conductors 3 are crimped and/or welded to the bus bars 6 and the contacts 8 are connected to the bus bars 6 by a push-in mechanism, by screwing and/or by welding.

In the implementation shown in FIG. 1 for use of an electrically conductive fluid as cooling liquid, the charging connector 1 comprises the second part 7, which consists of a thermally conductive and electrically insulating material to which the bus bars 6 are attached and respectively hold, as can be seen in the figure. Specifically, the second part 7 comprises two semi-circular-like openings, into which the bus bars 6 are inserted and such wise distant to each other hold in before described position with their longitudinal extension orthogonal to the longitudinal extension of the conductors 3 and to the contacts 8. Thereby, the semi-circular-like openings correspond in their form to an outer form of the bus bars 6. The bus bars 6 are such wise attached to the second part 7. In addition, the bus bars 6 can be brazed, glued and/or mechanically connected to the second part 7.

The second part 7 further comprises second fluid channels 11 provided within the second part 7 and fluidly and thermally connected to the fluid channels 4 for conveying the liquid coolant through the second part 7 such that heat generated in the contacts 8 during charging can be removed by the liquid coolant. The second fluid channels 11 are basically provided as a hollow chamber made of electrical insulating high thermal-conductivity ceramic, such as for example aluminium nitride or silicon nitride. Alternatively, the second part 7 can be made of thermal conductive plastics.

In this respect, FIGS. 3a-3f show possible implementations of inner geometries for the second part which can be used to enhance turbulence and promote heat transfer between coolant and power contacts 8. Numerical analysis on thermal performance of the charging connector 1 showed that the maximum temperature rise of the power contacts 8 during a charge session at a current within 500 A and 600 A is below 43 K in the ambient temperature range from −40° C. to +55° C. A pressure drop in the charging connector 1 is always below 1.2 bar in the foreseen flow rate range.

FIGS. 4a and 4b show an implementation for using a dielectric fluid as cooling liquid, such as a synthetic fluid or a hydraulic oil. In such case the bus bars 6, made of copper or aluminium, which basically substitute respectively replace the second part 7 and comprise bus bar fluid channels 10 to which the fluid channels 4 are thermally and fluidly connected. As before, the conductors 3 and the power contacts 8 of the DC+ and DC− loops are electrically and thermally operatively attached to the bus bars 6, which act both as bus bars 6 and as heat sinks.

The coolant flowing into the bus bar fluid channels 10 of the bus bars 6, shown in FIGS. 5a-5c, remove the heat generated by Joule effect into the power contacts 8 during a charging session. The arrows indicate the flow direction, surrounding roots of the power contact elements 8. The inner geometry of the bus bar fluid channels 10 enhances fluid turbulence and provide uniform flow distribution and can be, for example, provided analogous as shown in FIG. 3. The use of this heat sinks-bus bars 6 enhances the heat transfer area between the power contacts 8 and the coolant.

The charging connector 1 comprises a connector housing 12, indicated in FIG. 1 by a dotted line. All components of the charging connector 1 i.e. the first part 5, the bus bars 6 and, in regard to FIG. 1, the second part 7, are encapsulated within a soft epoxy and/or silicone-based material, whereby the conductors 3 and the contacts 8 are connected through the housing 12 and/or through the encapsulation to the bus bars 6.

In particular for charging the electrical vehicle with higher currents of more than 600 the power contact elements 8 can be provided with internal cooling channels 13 along their fingers to cope with the need for a higher heat flux removal. The contacts 8 may further comprise pockets for thermocouples, pockets for contact springs close to tips of the contacts 8 and/or stress relief openings at joints be-tween different contacts 8.

While the invention has been illustrated and described in detail in the drawings and foregoing description, such illustration and description are to be considered illustrative or exemplary and not restrictive; the invention is not limited to the dis-closed embodiments. Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a"

or "an" does not exclude a plurality. The mere fact that certain measures are recited in mutually different dependent claims does not indicate that a combination of these measures cannot be used to advantage. Any reference signs in the claims should not be construed as limiting scope.

REFERENCE SIGNS LIST 1 charging connector
2 charging cable
3 conductor
4 fluid channel
5 first part
6 bus bar
7 second part
8 contact
10 bus bar fluid channel
11 second fluid channel
12 housing
13 cooling channel All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A liquid cooled cable arrangement for high-power fast charging of electric vehicles, comprising:
    a charging connector and a liquid cooled charging cable,
    wherein the liquid cooled charging cable comprises a plurality of conductors for supplying charging current and at least two fluid channels for supply and return of a liquid coolant,
    wherein the charging connector comprises a plurality of bus bars and a plurality of contacts,
    wherein each one conductor is electrically and thermally connected to one bus bar and via the bus bar to one contact, and
    wherein the charging connector comprises a second part having a thermally conductive and electrically insulating material to which the bus bars are attached and to which the fluid channels are thermally connected such that heat generated in the contacts during charging is removed by the liquid coolant;
    wherein the bus bars comprise bus bar fluid channels to which the fluid channels are thermally connected such that heat generated in the contacts during charging is removed by the liquid coolant.

2. The liquid cooled cable arrangement according to claim 1, wherein the charging connector comprises a first part connected to the liquid cooled charging cable and crossed by the conductors and the fluid channels.

3. The liquid cooled cable arrangement according to claim 1, wherein the bus bars extend perpendicularly to the conductors and the contacts, and wherein whereby the conductors and the contacts are arranged perpendicularly displaced from each other by the bus bars.

4. The liquid cooled cable arrangement according to claim 1, wherein the second part comprises second fluid channels arranged within the second part and connected to the fluid channels for conveying the liquid coolant.

5. The liquid cooled cable arrangement according to claim 1, wherein the liquid coolant is an electrically conductive fluid.

6. The liquid cooled cable arrangement according to claim 1, wherein the liquid coolant is a dielectric fluid.

7. The liquid cooled cable arrangement according to claim 1, wherein the bus bars are brazed, glued and/or mechanically connected to the second part.

8. The liquid cooled cable arrangement according to claim 1, wherein the conductors are crimped and/or welded to the bus bars and/or wherein the contacts are connected to the bus bars by a push-in mechanism, by screwing and/or by welding.

9. The liquid cooled cable arrangement according to claim 1, wherein the charging connector comprises a connector housing, wherein at least the bus bars are encapsulated within a soft epoxy and/or silicone-based material, and wherein the conductors and the contacts are connected through the housing and/or through the encapsulation to the bus bars.

10. The liquid cooled cable arrangement according to claim 1, wherein the bus bars are provided with vapor chambers to spread heat generated in the contacts, and/or whereby the contacts comprise cooling channels connected to the fluid channels.

11. The liquid cooled cable arrangement according to claim 1, wherein the contacts comprise pockets for thermocouples, pockets for contact springs close to tips of the contacts and/or stress relief openings at joints be-tween different contacts.

12. The liquid cooled cable arrangement according to claim 2, wherein the first part is made from a plastic material.

13. A method for liquid cooling a charging connector connected to a liquid cooled charging cable for high-power fast charging of electric vehicles, comprising:
   providing a liquid cooled charging cable having a plurality of conductors for supplying charging current and at least two fluid channels for supply and return of a liquid coolant;
   wherein the charging connector comprises a plurality of bus bars and a plurality of contacts;
   wherein each one conductor is electrically and thermally connected to one bus bar and via the bus bar to one contact, and
   wherein the second part includes a thermally conductive and electrically insulating material to which the bus bars are connected and to which the channels are thermally connected;
   wherein the bus bars comprise bus bar fluid channels to which the fluid channels are thermally connected;
   wherein the method includes conveying liquid coolant through the fluid channels for removing heat generated during charging in the contacts.

14. The method according to claim 13, wherein the second part comprises second fluid channels connected to the fluid channels, and wherein the method further includes conveying liquid coolant through the second fluid channels for re-moving the heat generated during charging in the contacts.

15. The method according to claim 13, wherein the bus bars comprise bus bar fluid channels connected to the fluid channels, and wherein the method further includes conveying liquid coolant through the bus bar fluid channels for re-moving the heat generated during charging in the contacts.

* * * * *